July 24, 1951 C. B. SPASE 2,561,955
INTERNALLY EXPANDING FRICTION CLUTCH OR BRAKE
Filed June 8, 1948 2 Sheets-Sheet 1

*INVENTOR.*
CHARLES B. SPASE
BY Bodell & Thompson
Attorneys

July 24, 1951  C. B. SPASE  2,561,955

INTERNALLY EXPANDING FRICTION CLUTCH OR BRAKE

Filed June 8, 1948  2 Sheets-Sheet 2

INVENTOR.
CHARLES B. SPASE
BY Bodell & Thompson
Attorneys

Patented July 24, 1951

2,561,955

UNITED STATES PATENT OFFICE 2,561,955

INTERNALLY EXPANDING FRICTION CLUTCH OR BRAKE

Charles B. Spase, Nedrow, N. Y., assignor to Lipe-Rollway Corporation, Syracuse, N. Y., a corporation of New York Application June 8, 1948, Serial No. 31,768

1 Claim. (Cl. 192—65)

This invention relates to friction clutches and brakes, and has for its object a clutch or brake embodying an intermediate annular element of friction material having a cylindrical friction face on one side thereof concentric with the axis of the clutch or brake, which engages a complemental cylindrical friction face on another element and slips thereon when being applied and capable of slipping thereon until, as in the case of a clutch, the clutch is fully engaged, and also having opposing conical faces on its opposite side with which members of a pair having complemental faces coact when the clutch or brake is being engaged or applied, the pair of members having a relative axial shifting movement to engage the conical faces of the intermediate element and to release the same.

The invention consists in the novel features and in the combinations and constructions hereinafter set forth and claimed.

In describing this invention, reference is had to the accompanying drawings in which like characters designate corresponding parts in all the views.

Figure 1:
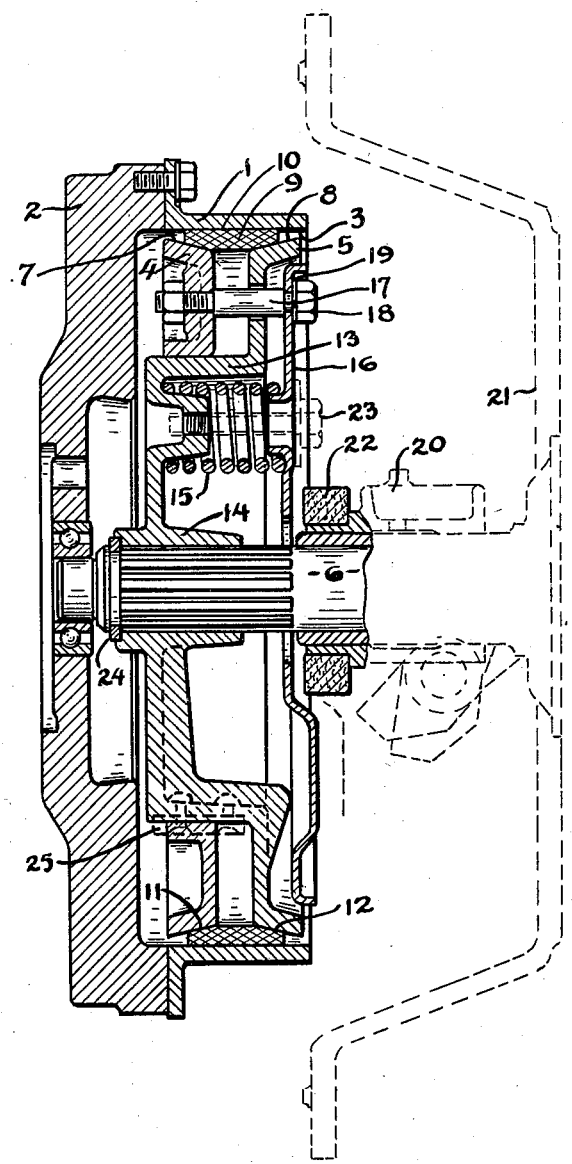
Figure 1 is a transverse sectional view, on line 1—1, Figure 2, of a clutch embodying this invention.
Figure 2:
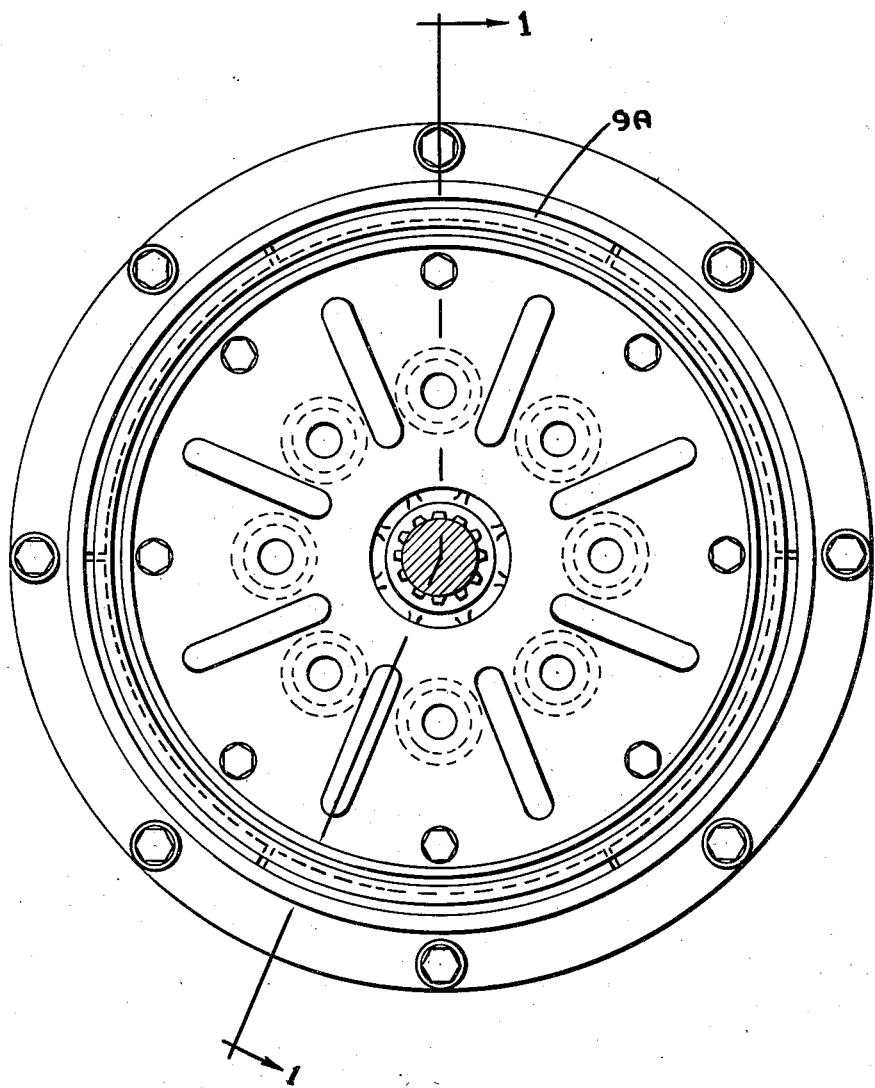
Figure 2 is a rear elevation of the clutch.

The invention is here illustrated as embodied in a clutch and comprises outer and inner concentric elements mounted to have relative rotative movement, one element being formed with a cylindrical friction face, the other element consisting of a pair of members, and an intermediate element of friction material, as moulded fiber, floatingly mounted between the outer and inner elements and having a cylindrical friction face on one side thereof for coacting with a cylindrical face of one of the former elements, and having opposing oppositely inclined conical friction faces on the other side thereof for coacting with complemental conical faces on the members of the pair, said members having a relative axial operating movement to cause their conical faces to engage those of the intermediate member, or to release therefrom.

The numeral 1 designates the driving element of a clutch, this being shown as mounted upon the fly wheel 2 of an engine, the driving element 1 having an internal cylindrical friction face 3.

4 and 5 designate a pair of driven members constituting the inner or driven element of the clutch, one of these members, as 5, being splined on the clutch shaft 6 and shiftable axially thereof, and the other member 4 being slidable axially on and rotatable with a hub on the member 5. These inner members 4, 5, are formed with peripheral conical faces 7, 8, respectively, inclined oppositely to each other, or from the opposite ends of said members inwardly. The conical faces are concentric with the axis of the clutch and in cross section inclined slightly out of parallelism with the axis of the clutch in contradistinction to out of a plane radial with the axis.

9 designates an intermediate element of friction or moulded fiber material, this having a cylindrical peripheral friction face 10, and also internal conical faces 11 and 12 on opposite ends thereof complemental to the faces 7 and 8 of the members 4, 5, respectively, and coacting inclined plane fashion therewith.

In the case of a clutch, the operating mechanism for the members 4, 5, consists of spring means arranged to shift the members 4, 5, axially toward each other and thus bring their conical faces 7 and 8 in contact with the complement faces 11 and 12 of the intermediate element 9, and the members 4, 5, are separated to disengage said conical faces by operator-operated means. As here illustrated, the member 5 is formed with an offset outer hub portion 13 telescoping in an enlarged axial opening in the other member 4, and the hub portion 13 has within it a second hub 14 slidably splined on the shaft 6.

The spring means includes a series of annular compression springs 15 within the hub portion 13 and interposed between the end wall of the hub portion 13 and a back plate 16 which is connected to the member 4 by bolts 17 slidable through holes in the member 5 and anchored to the member 4, the bolts 17 having heads 18 abutting against the outer side of the back plate 16. The back plate 16 is secured, as at 19, to the bolts 17 adjacent their heads 18 against axial shifting movement relatively to the bolts. The springs 15, which are initially loaded through the back plate 16 and the bolts 17, tend to shift the member 4 toward the member 5, and the thrust of the springs directly against the end wall of the hub portion 13 of the member 5 tends to shift the member 5 toward the member 4. The intermediate element 9, being floatingly mounted, can center itself to conform to the conical faces 7 and 8 of the members 4, 5.

The throw-out mechanism for the clutch consists of a throw-out collar 20 slidable axially of the clutch shaft 6. It is shown as mounted on a sleeve encircling the clutch shaft 6 and carried by the bell housing section 21 of the clutch casing. The throw-out collar is operated by clutch pedal mechanism. The throw-out collar has a ring 22 of friction material thereon normally spaced from the inner margin of the back plate 16. When the clutch pedal is shifted to disengage the clutch, the ring presses against the back plate 16 and, through the bolts 17, presses the member 4 away from the member 5, thus separating the member 4 and its conical face 7 from the conical face 11 of the intermediate member 9 and permitting the intermediate member 9 to release its face 12 from the conical face 8 of the member 5.

For the purpose of assembling the clutch parts and holding them assembled until the clutch is installed, bolts 23, shown in broken lines, extend through the back plate and axially through some of the springs and thread into the end wall of the hub portion 13. After the clutch is installed, these bolts 23 are removed.

In the clutch here shown, there are eight springs 15 in the annular series, and only three or four bolts 23 are used to hold the clutch assembled until installed.

The intermediate element 9 is composed of floating segments 9a arc shaped in general form.

In operation, while the outer element 1 is rotating and the clutch disengaged, the segments 9a frictionally engage and rotate with the element 1. When, however, the clutch is engaged, that is when the conical faces 7 and 8 are engaged with the conical faces 11 and 12, the friction is greater at these conical faces than at the outer cylindrical face of the intermediate element 9. Therefore, any slippage occurring while the clutch is engaged, or engaging, occurs between the cylindrical faces and hence, there is no differential slippage between the engaged cylindrical faces, and there being no differential slippage, the heat generated in the element 1 is uniform throughout said element, and no distortion or warping of the element 1 due to differential heating can occur. Due to the conical faces, but little relative axial shifting movement of the members 4, 5, is required to engage and disengage the clutch and no operating mechanism including leverage ratios is necessary as the conical faces supply what might otherwise be known as the leverage ratio. Also, due to the cylindrical friction faces, there is no axial thrust on the clutch shaft, or the driving element or fly wheel 2 and hence, there is no axial thrust transmitted to the bearings of the engine. To entirely relieve the engine shaft and its bearings of axial thrusts, any incidental thrust axially toward the crank shaft of the engine is taken by a shoulder or ring 24 interlocked with the clutch shaft 6. The member 4 is keyed or splined to the periphery of the hub portion 13 by keys 25 of any suitable construction.

What I claim is:

A friction clutch or brake comprising an outer rotatable element having an internal cylindrical friction face, an inner element comprising opposing members concentric with, and mounted to rotate relative to, the outer element and having relative axial shifting movement one toward and from the other, the inner members having opposing oppositely inclined peripheral conical faces, and a floating intermediate annular element of friction material between the outer and inner elements and having a peripheral cylindrical face for coacting with the inner cylindrical face of the outer element, and oppositely inclined conical faces on opposite ends thereof coacting inclined plane fashion with the conical faces of the inner members, a back plate opposed to one of said members and said one member having an outer hollow hub portion on which the other member is mounted to slide axially, and an inner hub member slidably splined on the clutch shaft, bolts anchored to the back plate against axial movement relatively thereto, slidably extended through the adjacent inner member outside of the outer hub portion and anchored to the other inner member, compression springs within the outer hub portion and thrusting at their opposite ends against the back plate and the end wall of said outer hub portion, and a non-rotatable throw-out collar shiftable axially of the clutch shaft and non-rotatable relatively thereto and having an annular shoulder located to thrust against the inner margin of the back plate when the throw-out collar is operated to disengage the clutch.

CHARLES B. SPASE.

REFERENCES CITED

The following references are of record in the file of this patent:

UNITED STATES PATENTS

| Number | Name | Date |
|---|---|---|
| 1,338,298 | Hansen | Apr. 27, 1920 |
| 1,472,710 | Wilson | Oct. 30, 1923 |
| 2,179,837 | Walkoff | Nov. 14, 1939 |

FOREIGN PATENTS

| Number | Country | Date |
|---|---|---|
| 366,117 | Great Britain | Jan. 28, 1932 |